United States Patent [19]

Enomoto

[11] Patent Number: 4,544,060
[45] Date of Patent: Oct. 1, 1985

[54] CHIP TRANSPORTING CONVEYOR

[75] Inventor: Yukio Enomoto, Kakamigahara, Japan

[73] Assignee: Enomoto Industry Co., Ltd., Japan

[21] Appl. No.: 564,743

[22] Filed: Dec. 22, 1983

[30] Foreign Application Priority Data

Dec. 28, 1982 [JP] Japan .............................. 57-230030
Mar. 14, 1983 [JP] Japan ................................ 58-42718
Apr. 7, 1983 [JP] Japan ................................ 58-61136
Apr. 21, 1983 [JP] Japan ................................ 58-70682

[51] Int. Cl.$^4$ ............................................. B65G 15/58
[52] U.S. Cl. ................................ 198/495; 198/690.1; 210/222
[58] Field of Search ...................... 198/495, 619, 690; 210/222, 223, 695

[56] References Cited

U.S. PATENT DOCUMENTS 3,476,232 11/1969 Merwin et al. ...................... 198/690

FOREIGN PATENT DOCUMENTS 1245841 7/1967 Fed. Rep. of Germany ...... 198/690
5687437 12/1979 Japan .

Primary Examiner—Joseph E. Valenza
Assistant Examiner—Lyle Kim
Attorney, Agent, or Firm—Leydig, Voit & Mayer, Ltd.

[57] ABSTRACT

A chip transporting conveyor includes a conveyor frame and an endless conveyor belt mounted on the conveyor frame and movable in circulatory motion for transporting and discharging chips at a terminal end of a conveyor zone. The endless conveyor belt having at least one magnet housing extending transversely of the endless conveyor belt. A permanent magnet body is accommodated in the magnet housing and movable therein between an attractive position in which the permanent magnet body is located adjacent to an inner wall surface of the magnet housing for attracting the chips to an attracting surface of the magnet housing while the chips are being transported and an unattractive position in which the permanent magnet body is located remotely from the inner wall surface for discharging the chips off the magnet housing when the latter is inverted around the terminal end.

18 Claims, 15 Drawing Figures

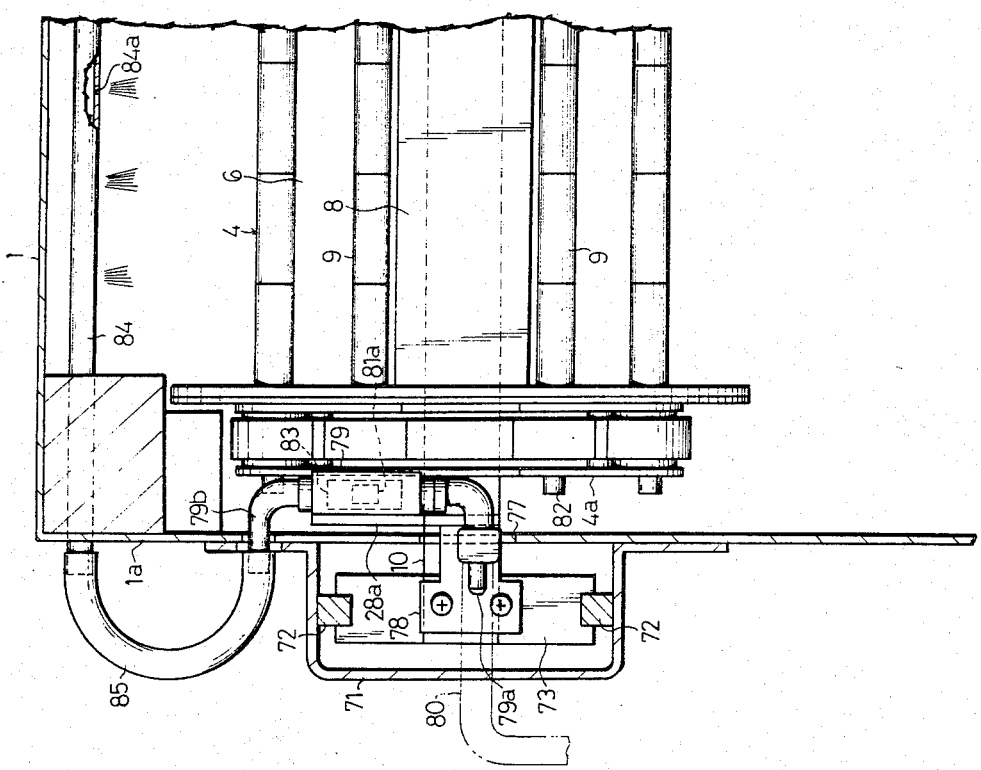
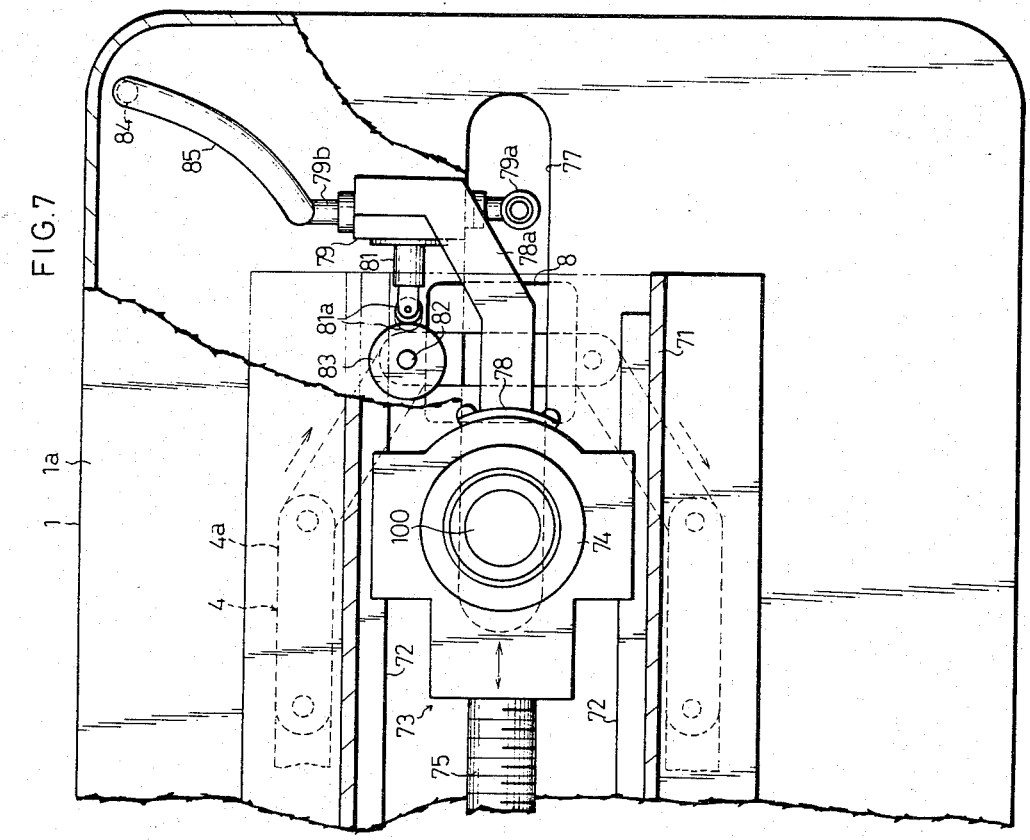

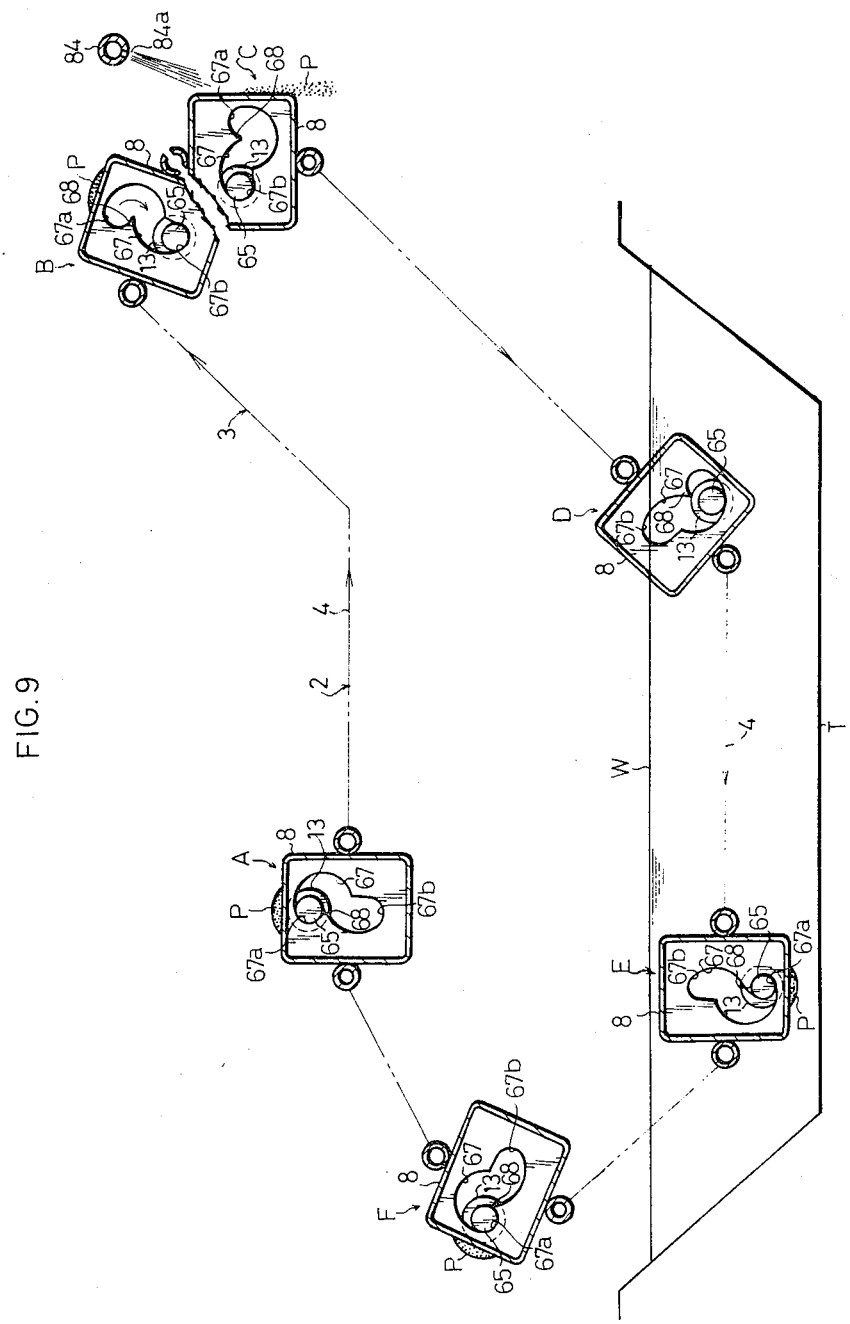

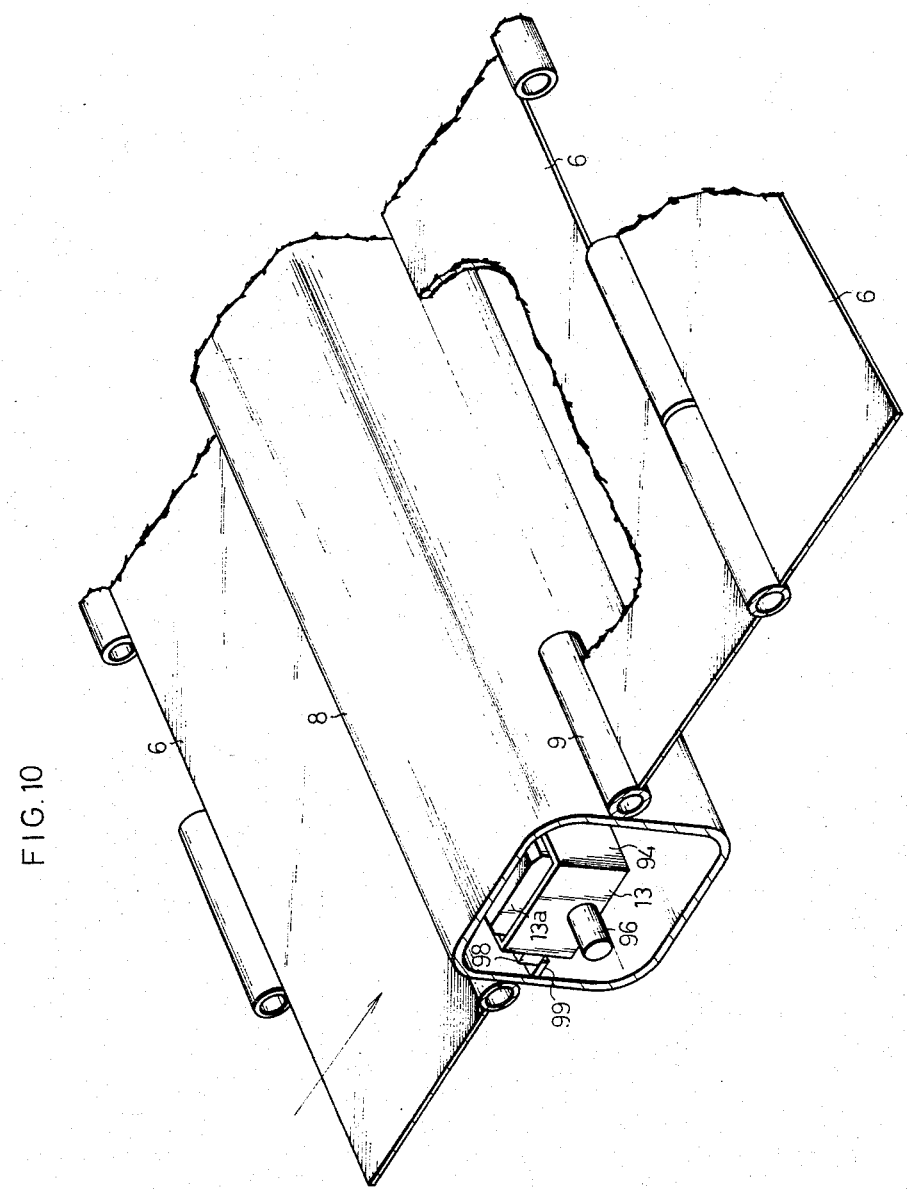

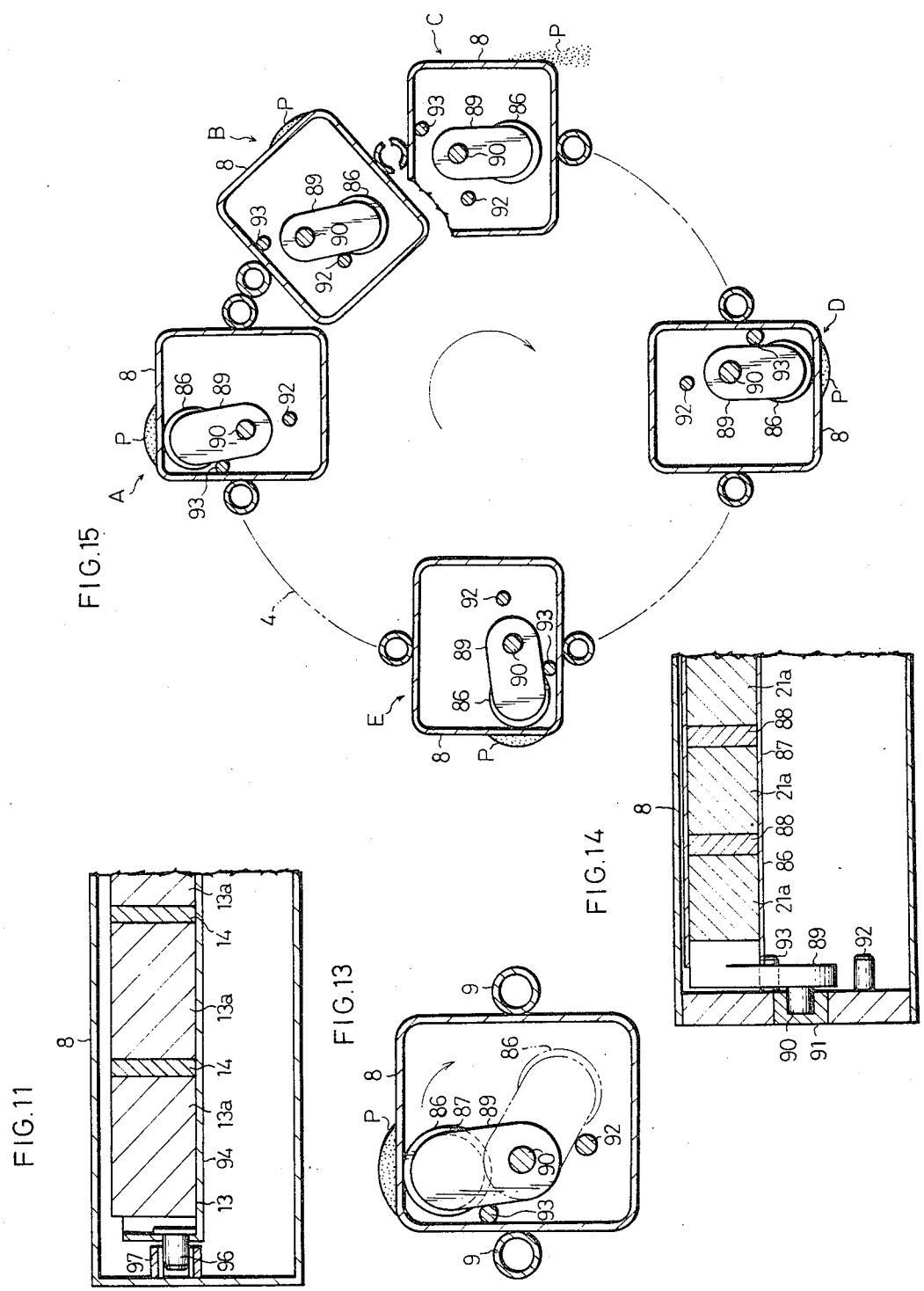

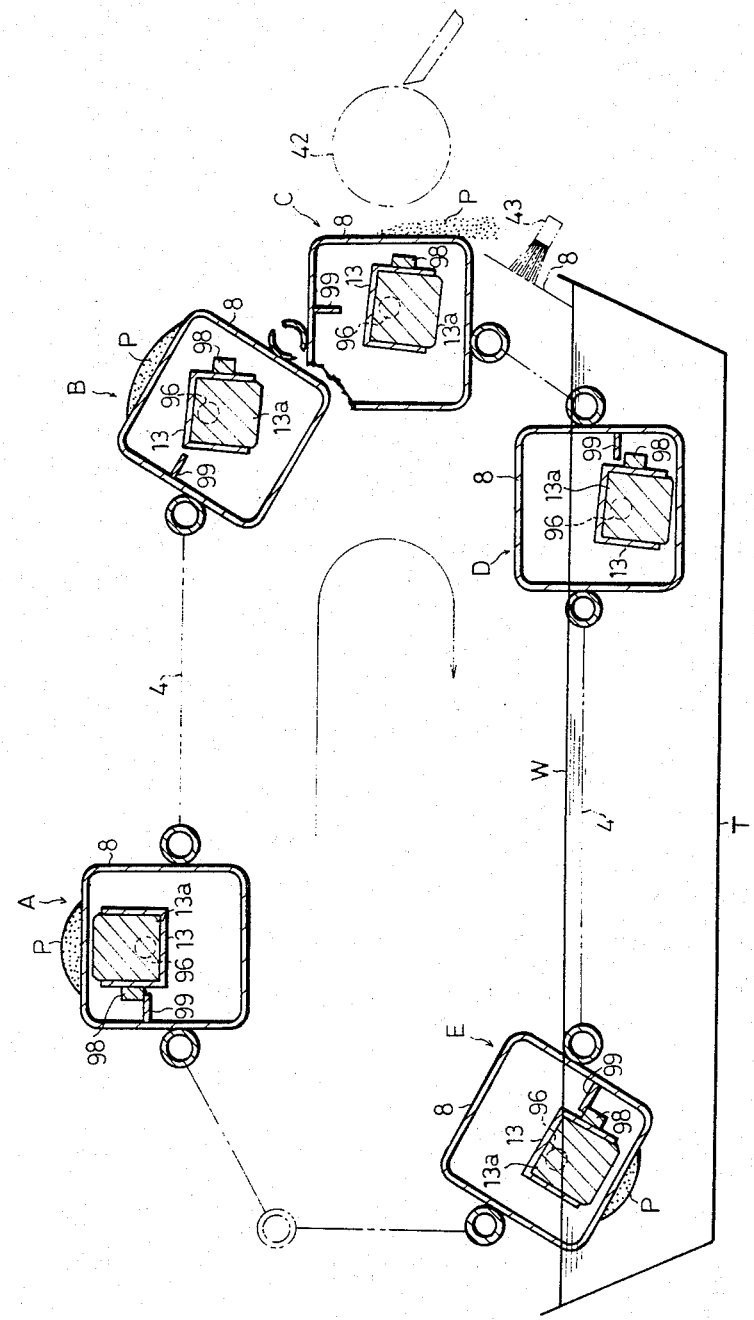

CHIP TRANSPORTING CONVEYOR

BACKGROUND OF THE INVENTION

1. Field of the invention:

The present invention relates to a chip transporting conveyor having an endless carrier movable in a circulatory path for transporting chips discharged from various machine tools or scraps such as punched-out pieces discharged from presses.

2. Description of the Prior Art:

There is known a belt conveyor mounted on a floor and having an endless conveyor belt composed of a multiplicity of hinged plates connected together. Chips discharged from a machine tool are allowed, together with the coolant, to fall on the belt. Filamentary and relatively large chips as they drop on the conveyor belt tend to remain thereon without being washed away by the coolant and be successively transported by the conveyor belt as it operates in circulatory motion. However, small chips such as powdery cast masses are caused by the coolant to flow through gaps between a conveyor frame and the conveyor belt and then remain on the bottom of the conveyor frame or are deposited in a coolant tank. Therefore, the belt conveyor of the type described has a poor efficiency of transportation of powdery chips, and also suffers from the drawbacks in that the remaining chips interfere with the circulatory motion of the conveyor belt and it is tedious and time-consuming to clean the interior of the coolant tank.

SUMMARY OF THE INVENTION

It is an object of the present invention to provide a chip transporting conveyor which is of a simple construction capable of reducing the quantity of chips washed off a conveyor belt, avoiding undesirable mechanical troubles, facilitating the maintenance of a coolant tank, and collecting powdery chips efficiently.

According to the present invention, a chip transporting conveyor includes a conveyor frame and an endless conveyor belt mounted on the conveyor frame and movable in circulatory motion for transporting and discharging chips at a terminal end of a conveyor zone. The endless conveyor belt having at least one magnet housing extending transversely of the endless conveyor belt. A permanent magnet body is accommodated in the magnet housing and movable therein between an attractive position in which the permanent magnet body is located adjacent to an inner wall surface of the magnet housing for attracting the chips to an attracting surface of the magnet housing while the chips are being transported and an unattractive position in which the permanent magnet body is located remotely from the inner wall surface for discharging the chips off the magnet housing when the latter is inverted around the terminal end.

Another object of the present invention is to provide a chip transporting conveyor having permanent magnet bodies movable by gravity in respective magnet housings for magnetically attracting and releasing powdery chips to and off the magnet housings.

Another object of the present invention is to provide a chip transporting conveyor having permanent magnet bodies accommodated in magnet housings respectively and movable reliably away from walls of the magnet housings to release powdery chips for dumping them off.

Still another object of the present invention is to provide a chip transporting conveyor having a fluid ejecting means operable reliably in synchronism with movement of a conveyor belt for removing residual powdery chips from magnet housings on the conveyor belt.

Still another object of the present invention is to provide a chip transporting conveyor having a fluid ejecting nozzle angularly adjustable for reliably blowing off residual powdery chips from magnet housings on a conveyor belt.

A still further object of the present invention is to provide a chip transporting conveyor having a fluid ejecting means for removing residual powdery chips from magnet housings on a conveyor belt, the fluid ejecting means being positioned in proper relation to the magnet housings at all times irrespectively of tension adjustment of the conveyor belt.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a side elevational view, partly broken away, of an upper end of a conveyor frame of the chip transporting conveyor of FIG. 6;

FIG. 8 is a rear elevational view of the conveyor frame upper end shown in FIG. 7;

FIG. 9 is a cross-sectional view showing the way in which the chip transporting conveyor of the third embodiment conveys chips;

FIG. 10 is an enlarged fragmentary perspective view, partly cut away, of a chip transporting conveyor according to a fourth embodiment of the present invention;

FIG. 11 is a fragmentary longitudinal cross-sectional view of a magnet housing of the chip transporting conveyor of FIG. 10;

FIG. 12 is a cross-sectional view showing the manner in which the chip transporting conveyor of the fourth embodiment conveys chips;

FIG. 13 is a transverse cross-sectional view of a magnet housing of a chip transporting conveyor according to a fifth embodiment of the present invention;

FIG. 14 is a fragmentary longitudinal cross-sectional view of the magnet housing illustrated in FIG. 13; and FIG. 15 is a cross-sectional view showing the manner in which the chip transporting conveyor of the fifth embodiment conveys chips.

DESCRIPTION OF THE PREFERRED EMBODIMENTS

Figure 1:
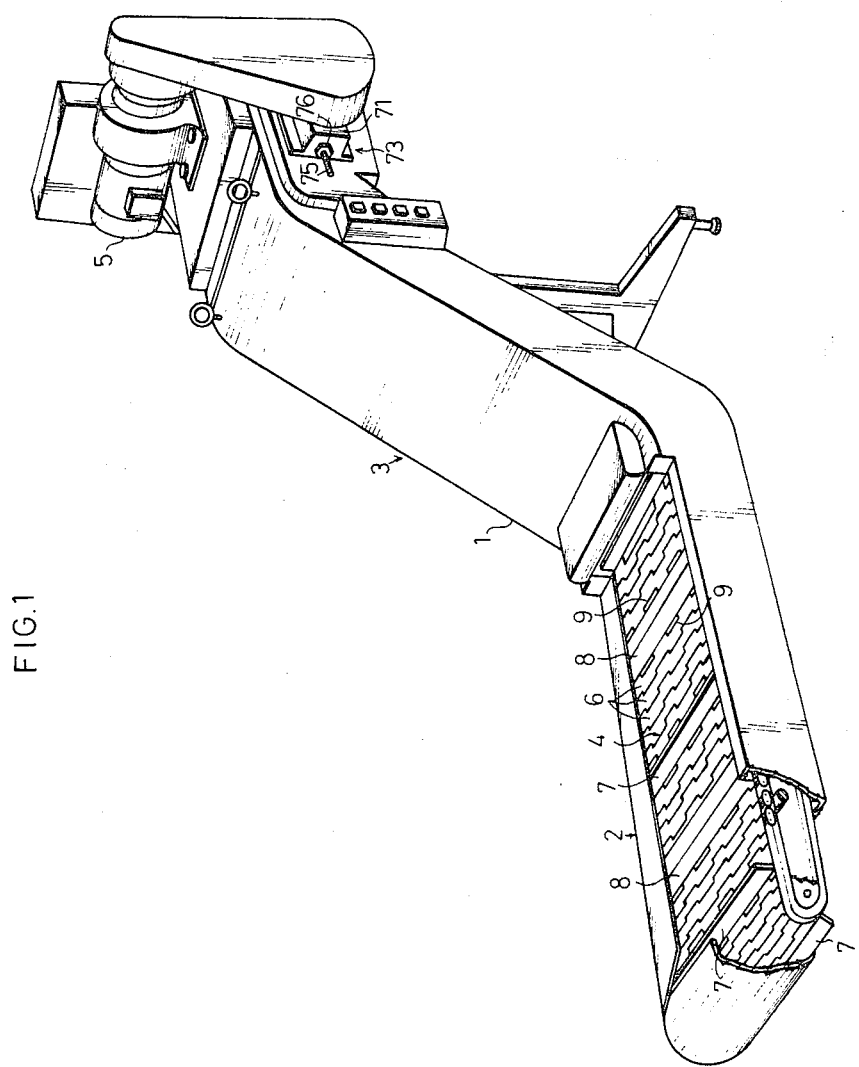
FIG. 1 is a perspective view of a chip transporting conveyor to be mounted on a floor according a first embodiment of the present invention.
Figure 2:
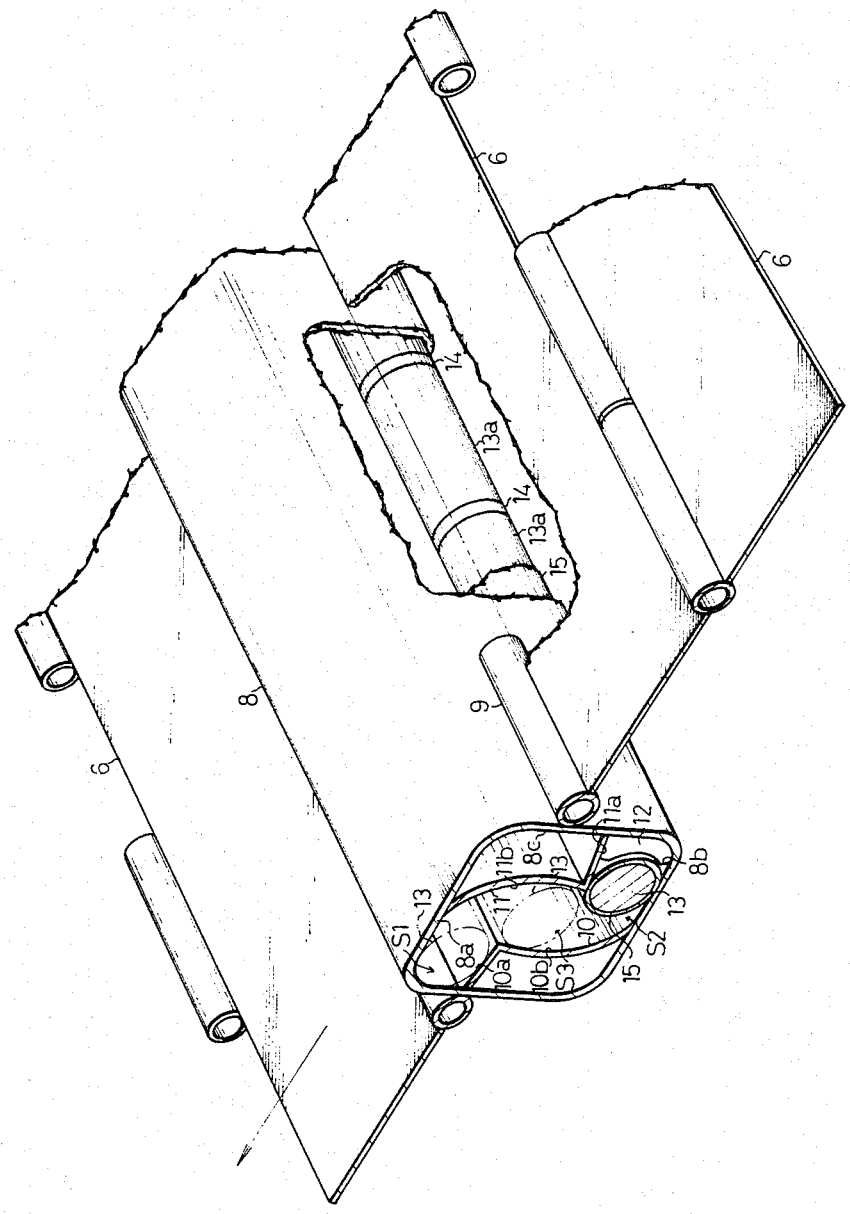
FIG. 2 is an enlarged fragmentary perspective view, with parts cut away, of a portion of the chip transporting conveyor shown in FIG. 1.
Figure 3:
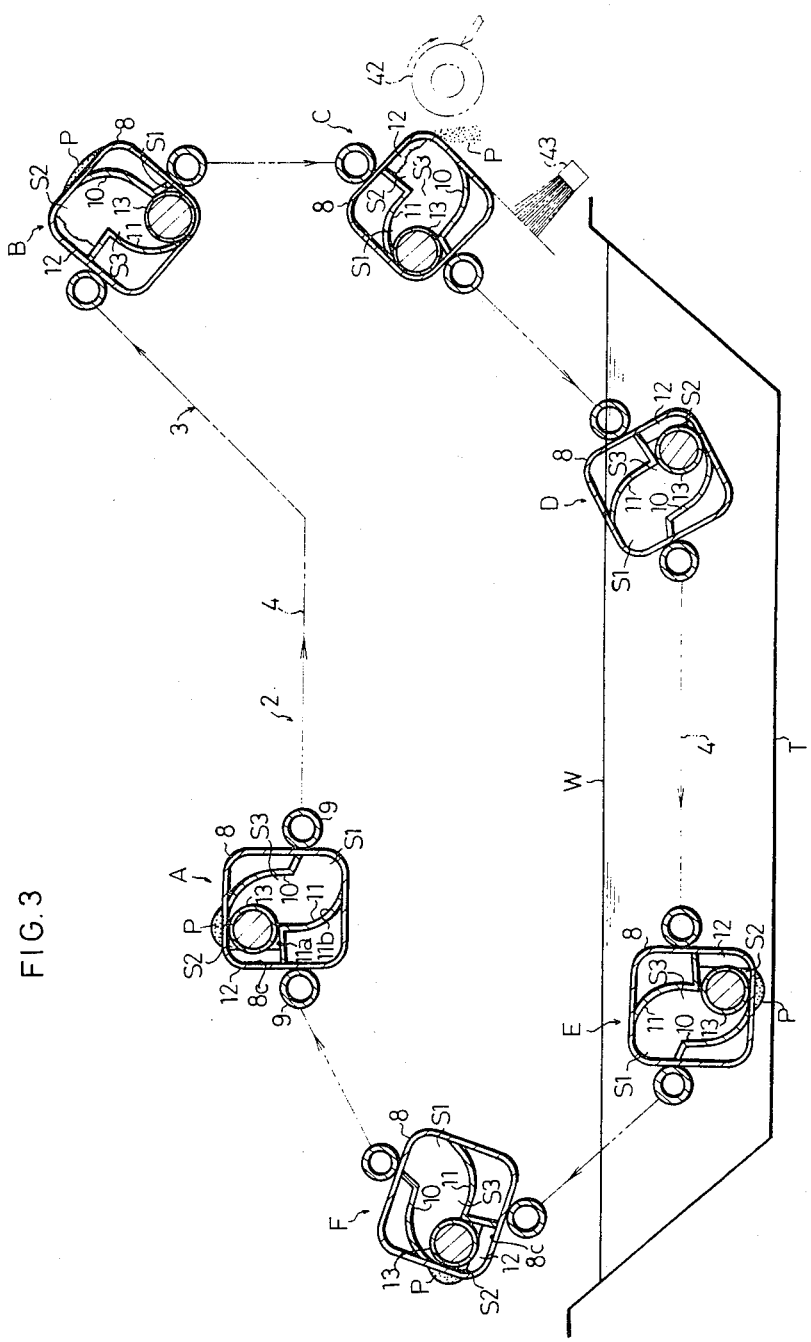
FIG. 3 is a cross-sectional view illustrative of the manner in which the chip transporting conveyor of FIG. 1 operates to convey chips.

FIGS. 1 through 3 show a chip transporting conveyor to be mounted on a floor according to a first embodiment of the present invention.

The chip transporting conveyor has a conveyor frame 1 composed of a horizontal conveyor channel 2 with an open upper side and a slanted conveyor channel 3 coupled to the horizontal conveyor channel 2 and extending obliquely upwardly therefrom. An endless conveyor belt 4 is mounted in the conveyor channels 2, 3 and movable in circulatory motion therein. The chip transporting conveyor also includes a gear motor 5 mounted on an upper end of the slanted conveyor channel 3 for driving an upper run of the conveyor belt 4 to move from the horizontal conveyor channel 2 toward the slanted conveyor channel 3.

The conveyor belt 4 comprises a multiplicity of hinged plates 6 (better shown in FIG. 2) made from steel and pivotally interconnected, and scraper plates 7 welded on upper surfaces of some hinged plates 6 at regular intervals and extending transversely of the conveyor belt 4, the scrape plates 7 projecting perpendicularly to the conveyor belt 4. While the conveyor belt 4 is in circulatory motion, filamentary and relatively large chips are transported by the scraper plates 7 obliquely upwardly through the slanted conveyor channel 3.

The conveyor belt 4 includes a plurality of magnet housings 8 of stainless steel extending transversely thereof and disposed between adjacent hinged plates 6 at certain intervals. As shown in FIG. 2, each of the magnet housings 8 has hinges 6 fixed to opposite sides thereof and pivotally connected to the adjacent hinged plates 6.

Each magnet housing 8 includes a pair of diagonally opposite front and rear guide member 10, 11 disposed therein and welded to inner wall surfaces thereof, the guide members 10, 11 extending longitudinally of the magnet housing 8. The front and rear guide members 10, 11 have narrower straight portions 10a, 11a, respectively, and wider curved portions 10b, 11b extending therefrom in radially outward directions. The portions 10a, 10b of the front guide member 10 extend at an obtuse angle close to a right angle to each other, and the portions 11a, 11b of the rear guide member 11 extend at an acute angle close to a right angle to each other. As illustrated in FIG. 2, the straight portion 10a of the front guide member 10 and an upper side plate 8a of the magnet housing 8 jointly define therebetween a first magnet accommodating space S1 which is progressively wider toward the center of the magnet housing 8. The straight portion 11a of the rear guide member 11 and a lower side plate 8b of the magnet housing 8 jointly define therebetween a second magnet accommodating space S2 which is progressively narrower toward the center of the magnet housing 8. The curved portions 10b, 11b of the guide members 10, 11 jointly define therebetween a magnet falling passage S3. The magnet housing 8 includes a rear side plate 8c to which there are fixed a plurality of stop plates 12 projecting into the second magnet accommodating space S2.

A permanent magnet body 13 is disposed between the front and rear guide members 10, 11 in the magnet housing 8. The permanent magnet body 13 comprises a plurality of rod-shaped magnets 13a of circular cross section arranged axially with aluminum plates 14 interposed, and a pipe 15 of stainless steel accommodating the rod-shaped magnets 13a and the aluminum plates 14 therein. As illustrated in FIG. 3, the magnetic housings 8 are inverted as the conveyor belt 4 is in circulatory motion, whereupon the permanent magnet bodies 13 move reciprocably due to gravity through the magnet falling passage S3 bewteen the first and second magnet accommodating spaces S1, S2.

The chip transporting conveyor of the foregoing construction will operate as follows:

Although there are many magnet housings 8 mounted on the conveyor belt 4, only one of them will be described for the sake of brevity with respect to its operation in the following description. Chips and coolant are discharged from various machine tools through the upper open side of the conveyor frame 1 onto the conveyor belt 4 in the horizontal conveyor channel 2, and are transported into the slanted conveyor channel 3 as the conveyor belt 4 operates in circulatory motion. At this time, the straight portion 11a of the rear guide member 11 in each magnet housing 8 on the upper horizontal run of the conveyor belt 4 is inclined downwardly toward the rear side plates 8c, and hence the permanent magnet body 13 in the magnet housing 8 is prevented from falling down by the straight portion 11a and remain positioned in the second magnet accommodating space S2, as shown at A in FIG. 3. Therefore, powery chips P are magnetically attracted to the upper surface of the magnet housing 8. This arrangement can reduce the quantity of any powdery chips flowing with the coolant below the conveyor belt 4 as compared with a conventional conveyor. The powdery chips P as they are attracted to the magnet housing 8 are then transported up to the slanted conveyor channel 3, and filamentary and relatively large chips are also transported up the slanted conveyor channel while they are placed on the upper surface of each hinged plate 6 or received by the front surface of each scraper plate 7.

As the magnet housing 8 reaches the upper end of the conveyor frame 1 and the conveyor belt 4 is about to turn downwardly as indicated at B in FIG. 3, the magnet housing 8 becomes inverted and the permanent magnet body 13 falls by gravity through the falling passage S3 into the first magnet accommodating space S1. Therefore, the magnetic forces imposed by the permanent magnet body 13 on the upper surface of the magnet housing 8 are reduced to the point where the powdery chips P are no longer subjected to magnetic attraction and will fall by gravity off the magnet housing 8 as the latter is turned upside down as shown at C in FIG. 3. At the same time, the filamentary and large chips are also caused by gravity to fall off the hinged plates 6 and scraper plates 7. The powdery chips P and the filamentary and large chips are collected in a collector box (not shown) disposed below the conveyor frame 1.

Then the magnet housing 8 from which the powdery chips P have been discharged is moved donwardly with a lower run of the conveyor belt 4 in the slanted conveyor channel 3 as the conveyor belt 4 travels in circulatory motion. When the magnet housing 8 reaches the horizontal conveyor channel 2, the straight portion 10a of the front guide member 10 is inclined downwardly toward the falling passage S3 as shown at D in FIG. 3. Therefore, the permanent magnet body 13 is allowed to fall by gravity through the falling passage S3 into the second magnet accommodating space S2, whereupon the permanent magnet body 13 is stopped and held at rest by the stop plates 12. In the illustrated application in which the conveyor frame 1 is partly placed in a coolant tank T containing a coolant W, powdery and granular chips deposited on the bottom of the coolant tank T and powdery chips P suspended in the coolant W are magnetically attracted to the lower surface of the magnet housing 8 under magnetic forces from the permanent magnet body 13, as indicated at E in FIG. 3, while the magnet housing 8 is moved along with the lower run of the conveyor belt 4 through the horizontal conveyor channel 2.

With the chip transporting conveyor of the foregoing embodiment, the quantity of any chips P in the coolant W can be reduced as compared with that of chips in the coolant tank of conventional chip transporting conveyors. Accordingly, troubles such as clogging can be prevented when the coolant is used again, and the coolant tank T can be periodically cleaned less frequently.

In case the conveyor frame 1 is not placed in the coolant tank T as shown in FIG. 1, powdery chips P falling through gaps between the conveyor frame 1 and the conveyor belt 4 and deposited on the bottom of the conveyor frame 1 can efficiently be attracted and collected by each magnet housing 8. The chip transporting conveyor of the above construction is therefore free from operation failures of the conveyor belt 4 which would otherwise result from remaining chips being caught between the conveyor belt 4 and the conveyor belt 1.

As the conveyor belt 4 further travels along, the magnet housing 8 with the powdery chips P attracted thereto reaches the upper run of the conveyor belt 4 in the horizontal conveyor channel 2 while the magnet housing 8 is inverted, as indicated at F in FIG. 3. Since the straight portion 11a of the rear guide member 11 is inclined downwardly toward the rear side plate 8c of the magnet housing 8 in this position as described above, the permanent magnet body 13 is prevented from falling by gravity even when the magnet housing 13 is angularly displaced into the position shown at A in FIG. 3. Consequently, the powdery chips P can be transported along while they are reliably attracted to the upper surface of the magnet housing 8.

As shown in FIG. 3, a rotatable magnet roller 42 may be disposed, as indicated by the two-dot-and-dash lines, in confronting relation to the magnet housing 8 in the chip discharging position shown at C for forcibly attracting and collecting chips attached to the magnet housing 8, the hinged plates 6, and the scraper plates 7 after the chips P have been discharged by gravity. Furthermore, a brush 43 may be placed, as indicated by the two-dot-and-dash lines, in contact with the outer surface of the magnet housing 8 immediately below the chip discharging position C for removing any residual chips off the magnet housing 8 after the chips P have been dumped off.

Figure 5:
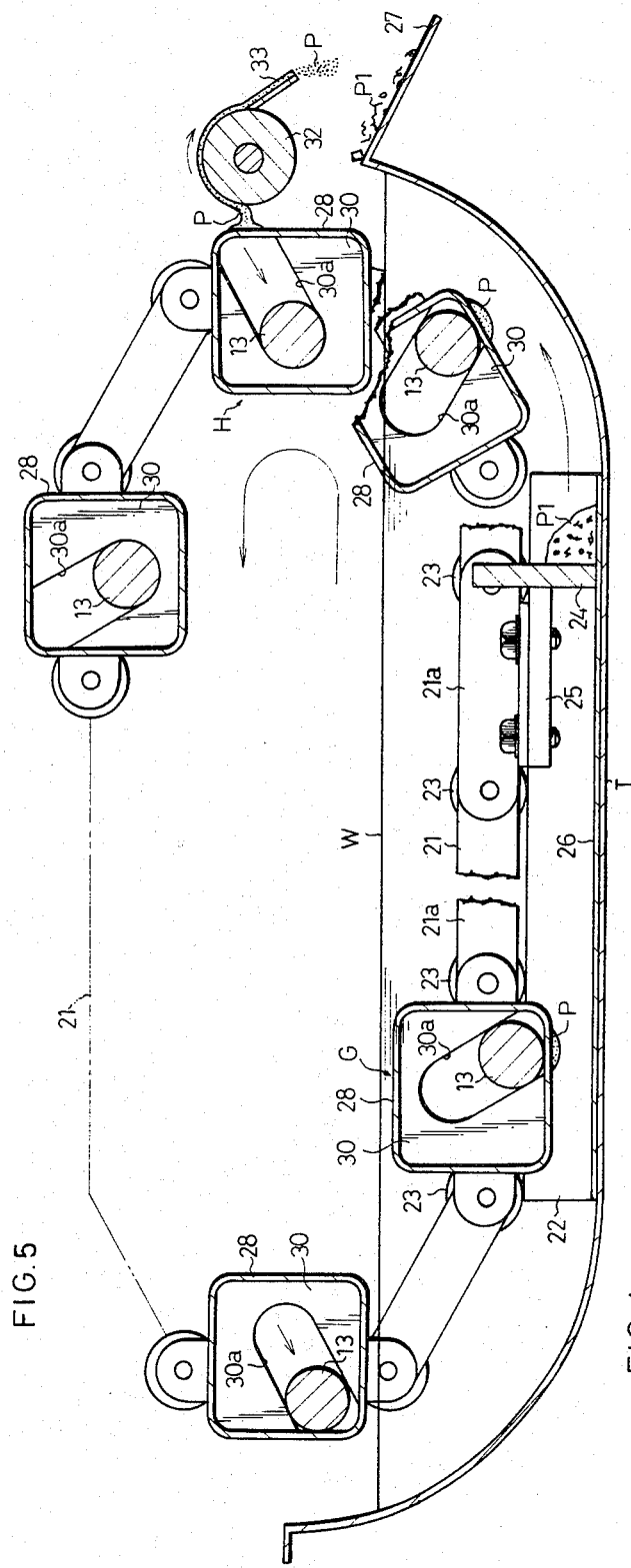
FIG. 5 is a cross-sectional view showing the manner in which the chip transporting conveyor of FIG. 4 conveys chips.
Figure 4:
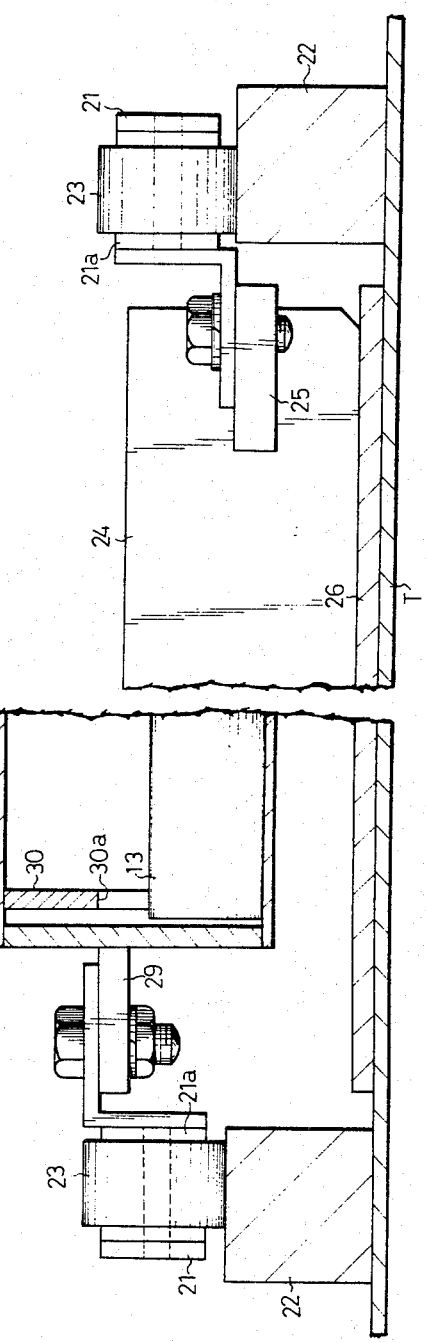
FIG. 4 is a fragmentary cross-sectional view of a chip transporting conveyor with scrapers according to a second embodiment of the present invention.

A chip transporting conveyor with scrapers according to a second embodiment of the present invention will be described with reference to FIGS. 4 and 5.

A pair of confronting endless chains 21 is mounted for circulatory motion on a conveyor frame (not shown). Each of the endless chains 21 is composed of chain links 21a coupled together by pins on which there are supported rollers 23 rollingly engageable with upper surfaces of two guide rails 22 fixed to a bottom 26 of a coolant tank T. A plurality of plate-shaped scrapers 24 (one shown in FIG. 5) extend transversely thereof in a direction normal to the direction of transportation and are each mounted on corresponding chain links 21a by attachement plates 25 disposed on opposite ends of the scraper plate 24 and fastened to the chain links 21a. Each scraper plate 24 has a distal edge extending in the vicinity of the bottom 26 of the coolant tank T. As the endless chains 21 travel in circulatory motion, each scraper 24 pushes on its front surface filamentary and large chips P1 until they are discharged out down a discharge chute 27 mounted on a front edge of the coolant tank T.

A plurality of magnet housings 28 are mounted on the endless chains 21 at certain intervals and extend transversely thereof parallel to the scrapers 24. Each of the magnet housings 28 is secured to the corresponding confronting chain links 21a by attachment plates 29 projecting from opposite ends of the magnet housing 28. Each magnet housing 28 includes a pair of guide plates 30 (one shown) welded to inner wall surfaces at opposite ends thereof. Each of the guide plates 30 has therein a substantially U-shaped guide recess 30a extending substantially diagonally thereof and having an open end. Each magnet housing 28 houses a rod-shaped permanent magnet body 13 extending longitudinally thereof and movable therein, the permanent magnet body 13 having opposite ends fitted in the guide recesses 30a in the guide plates 30. As shown in FIG. 5, when each magnet housing 28 is inverted as the endless chains 21 move in circulatory paths, the permanent magnet body 13 is guided by the guide plates 30 to move between an attractive position in which the permanent magnet body 13 is in contact with the inner wall surface of the magnet housing 23 and an unattractive position, spaced from the attractive position, in which the permanent magnet body 13 is located at the closed end of the recess 30a.

A magnet roller 32 is rotatably supported on the conveyor frame above the discharge chute 27 in confronting relation to the magnet housing 28 as positioned immediately above the coolant tank T. Powdery chips P which are discharged from the magnet housing 28 are forcibly magnetically attracted to the outer peripheral surface of the magnet roller 32 under magnetic forces therefrom. Then, the powdery chips P are scraped off the magnet roller 32 by a scraper plate 33 held in contact with the magnet roller 32.

Operation of the chip transporting conveyor of the second embodiment will be described with reference to one of the magnet housings 28. While the magnet housing 28 moves in the coolant tank T, the permanent magnet 13 body falls by gravity into the attractive position as indicated at G in FIG. 5 to thereby magnetically attract powdery chips P suspended in a coolant W in the coolant tank T to the lower surface of the magnet housing 28.

As the endless chains 21 travel in circulatory motion to move the magnetic housing 28 to a position H out of the coolant tank T in confronting relation to the magnet roller 32, the magnet housing 28 is inverted to allow the permanent magnet body 13 to move by gravity to the unattractive position while being guided by the guide recesses 30a, thus releasing the powdery chips P of the magnetically attracted condition. The powdery chips P discharged off the magnet housing 28 are collected by the magnet roller 32 and the scraper plate 33 into a collector body (not shown). With the second embodiment, therefore, powdery chips P mixed in the coolant W can efficiently be removed and collected as with the first embodiment.

By arranging the chip transporting conveyor of the second embodiment such that powdery chips P can be dumped off the magnet housing 28 at a position peripherally outward of the coolant tank T, the powdery chips P fall of their own accord onto the discharge chute 27 without the intermediaries of the magnet roller 32 and the scraper plate 33. This construction is simpler than the illustrated arrangement. A brush identical to the brush 42 shown in FIG. 3 may be included in the second embodiment for collecting powdery chips P at an improved efficiency.

FIGS. 1 and 6 through 9 are illustrative of a chip transporting conveyor according to a third embodiment of the present invention.

Figure 6:
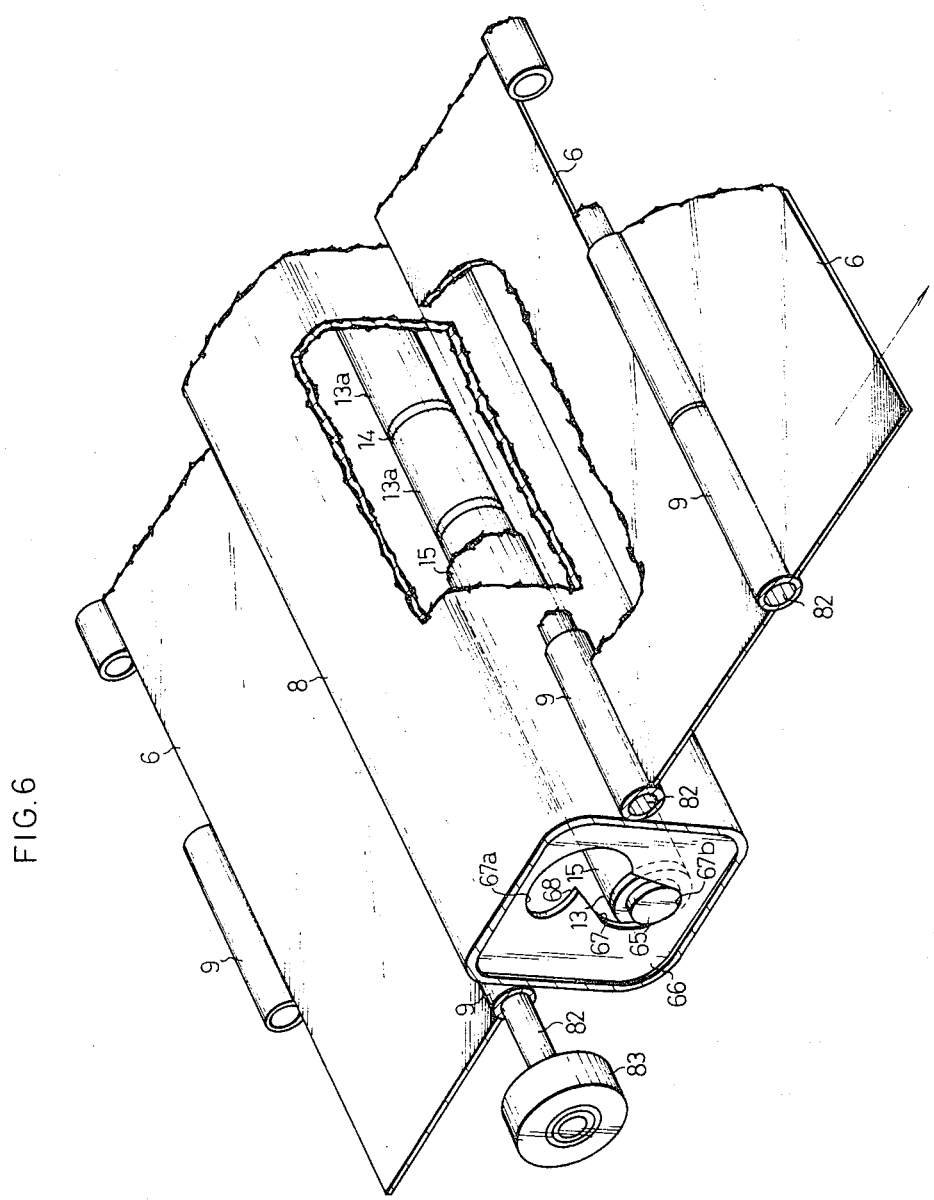
FIG. 6 is an enlarged fragmentary perspective view, with parts broken away, of a chip transporting conveyor according to a third embodiment of the present invention, the view showing a magnet housing and a permanent magnet housed therein.

Each of rod-shaped permanent magnet bodies 13 has support shafts 65 on opposite ends thereof. Each permanent magnet body 13 is accommodated in a magnet housing 8 having two guide plates 66 fixedly fitted in opposite ends thereof and each having a guide hole 67 extending substantially vertially as shown in FIG. 6 in a substantially central position. Each of the support shafts 65 is fitted in one of the guide holes 67. Each guide plate 66 includes a holder projection 68 extending inwardly and upwardly from a rear edge of the guide hole 67 and defining a holder cavity 67a directed rearward above the guide hole 67. When the support shafts 65 are fitted respectively in the holder cavities 67a as indicated at A in FIG. 9, the permanent magnet body 13 is prevented by the holder projections 68 from falling down and retained in an attractive position in which the permanent magnet body 67a has its outer peripheral surface positioned adjacent to an upper inner wall surface of the magnet housing 8.

Each guide hole 67 has a lower end serving as a support surface 67b for bearing one of the support shafts 65 of the permanent magnet 13 falling from the attractive position. When the support shafts 65 are borne by the support surfaces 67b, the permanent magnet body 13 is held in an unattractive position in which it is spaced a certain distance from the upper inner wall surface of the magnet housing 8.

As shown in FIGS. 7 and 8, a conveyor frame 1 has upper side plates 1a (one shown) with protective cases 71 mounted on outer surfaces thereof, respectively, and housing therein a pair of bearing units 73 (one shown) slidably supported on rails 72 and having ball bearings 74, respectively. A chain wheel shaft 100 has opposite ends supported by the ball bearings 74. Each of the bearing units 73 includes a bolt 75 with an adjustment nut 76 (see FIG. 1) threaded thereon. By turning the adjustment nuts 76, the chain wheel shaft 100 is moved back and forth in slots 77 defined in the side plates 1a of the conveyor frame 1 so that the conveyor belt 4 can be adjusted in tension.

One of the bearing units 73 has a bracket 78 affixed to a front edge thereof and including a support arm 78a projecting through the slot 77 inwardly of the side plate 1a and extending in front of a turning end of the conveyor belt 4. A valve 79 is mounted on the support arm 78a in confronting relation to one chain 4a of the conveyor belt 4 and has an air inlet 79a to which is connected an air supply hose 80 leading from an air source (not illustrated).

The valve 79 can be opened or closed by a movable plunger 81 having a roller 81a supported on one end thereof and capable of contacting one at a time of cam rollers 83 (FIG. 6) mounted on ends of connecting rods 82 extending respectively through the hinges 9 disposed rearward of the magnet housings 8. When each of the magnet housings 8 reaches the chip discharging position while the conveyor belt 4 travels in circulatory motion, the cam roller 83 behind the magnet housing 8 pushes the roller 81a to retract the plunger 81 into the valve 79 for thereby opening the valve 79. Thus, the valve 79 remains open as long the plunger 81 is retracted.

A tubular nozzle 84 having an array of orifices 84a is angularly movably supported between an upper side plates 1a of the conveyor frame 1. A hose 85 made of vinyl extends from a discharge port 79b of the valve 79 and is connected to one end of the tubular nozzle 84. When the valve 79 is opened, air is ejected from the tubular nozzle 84 through the orifices 84a toward the attracting surface of the magnet housing 8 disposed in the chip discharging position. The angle at which air is ejected out of the orifices 84a with respect to the magnet housing 8 can be adjusted by angularly moving the tubular nozzle 84 about its own axis.

The chip transporting conveyor according to the third embodiment operates as follows:

While each of the magnet housings 8 moves along into the slanted conveyor channel 3 during circulatory movement of the conveyor belt 4, the permanent magnet body 13 is prevented by the holder projections 68 from falling and is retained in the attractive position, as indicated at A in FIG. 9, so that powdery chips P are attracted to the upper surface of the magnet housing 8 under magnetic forces from the permanent magnets 13a.

When the magnet housing 8 arrives at the upper end of the slanted conveyor channel 3 of the conveyor frame 1 and the conveyor belt 4 is turned downwardly as shown at B in FIG. 9, the magnet housing 8 is inverted to allow the permanent magnet body 13 falls by gravity into the unattractive position. The magnetic forces acting on the attracting surface of the magnet housing 8 are reduced to release most of the attracted powdery chips P which then fall by gravity as illustrated at C in FIG. 9.

In synchronism with the movement of the permanent magnet body 13 to the unattractive position, the cam roller 83 disposed behind the magnet housing 8 pushes the roller 81a to retract the plunger 81 for thereby opening the valve 79 for a fixed period of time, whereupon air is ejected through the orifices 84a out of the tubular nozzle 84 toward the chip attracting surface of the magnet housing 8.

Those powdery chips P which remain attached to the chip attracting surface of the magnet housing 8 under the residual magnetic force of the permanent magnetic body 13 and the sticking force of the coolant are blown off by the ejected air. Accordingly, almost all of the powdery chips P which have been transported by the magnet housing 8 can be retrieved in the chip discharging position C.

With the valve 79 mounted by the bracket 78 on the bearing unit 23, the valve 79 and the conveyor belt 4 are moved in unison during adjustment of the tension of the conveyor belt 4 without varying the positional relationship between the roller 81a of the plunger 81 and the cam roller 83. Therefore, such tension adjustment can easily be effected. If the magnet housing 8 is positionally displaced in the position C due to such tension adjustment, then the tubular nozzle 84 should be appropriately turned about its own axis to adjust the angle at which air is directed toward the magnet housing 8 for best chip removal capability.

After the magnet housing 8 has discharged the powdery chips P and moved down the slanted conveyor channel 3 with the lower run of the conveyor belt 4 as the latter travels along, the magnet housing 8 reaches the horizontal conveyor channel 2 as indicated at D in FIG. 9, whereupon the permanent magnet 13 returns to the attractive position due to gravity. Then, powdery chips P remaining on the bottom of the coolant tank T and suspended in the coolant W are magnetically attracted to the lower surface of the magnet housing 8 under the magnetic forces from the permanent magnet body 13.

The magnet housing 8 with the powdery chips P attracted thereto moves in the coolant tank T while the permanent magnet body 13 is held in the attractive position by the support shafts 65 thereof fitted in the holder cavities 67a, as shown at F in FIG. 9. The magnet housing 8 is then moved upwardly onto the upper run of the conveyor belt 4 in the horizontal conveyor channel 2. Although the magnet housing 8 is turned upside down at this time, the permanent magnet body 13 is retained in the attractive position by the holder projections 68.

The valve 79 may be opened by an optical sensor capable of sensing a beam of light reflected by the magnetic housing 8. Instead of air, another fluid such as water or a coolant may be ejected from the tubular valve toward the magnet housing to remove residual chips.

A chip transporting conveyor according to a fourth embodiment will be described with reference to FIGS. 10 through 12.

As shown in FIGS. 10 and 11, a rod-shaped permanent magnet body 13 of a rectangular cross section is disposed longitudinally in a magnet housing 8. The permanent magnet body 13 is composed of an array of rod-shaped magnets 13a with aluminum or lead plates 14 interposed and an inner box 94 of stainless steel having an open upper end and housing therein the magnets 13a and the plates 14. The magnets 13a have surfaces exposed through the open upper end of the inner box to exert magnetic forces.

The inner box 94 has on its opposite ends a pair of shafts 96 displaced downwardly (as shown in FIGS. 10 and 11) from the central axis of the permanent magnet body 13 and journalled in bushings 97 secured to opposite inner wall surfaces of the magnet housing 8. As shown in FIG. 12, the permanent magnet body 13 is thus angularly movable about the shafts 96 between an attractive position in which the exposed surfaces of the permanent magnets 13a are located adjacent to an inner wall surface of the magnet housing 8 and an unattractive position in which the exposed surfaces of the permanent magnets 13a are located remotely from the inner wall surface of the magnet housing 8, as a conveyor belt 4 operates in circulatory motion.

A stop member 99 projects from the inner surface of a rear side wall of the magnet housing 8 and is engageable with a weight bar 98 attached to the outer surface of a rear side wall of the inner box 94 and having a suitable length for positionally adjusting the center of gravity of the permanent magnet body 13. When the permanent magnet body 13 is in the attractive position as shown in FIG. 10 and at A in FIG. 12, the permanent magnet body 13 is prevented from being turned clockwise about the shafts 96 by the weight bar 98 urged by gravity to angularly move counterclockwise into engagement with the stop member 99.

Since the permanent magnet body 13 in the magnet housing 8 is held in the attractive position with the weight bar 98 engaging the stop member 99 as shown at A in FIG. 12, powdery chips P are magnetically attracted to the upper surface of the magnet housing 8 under magnetic forces from the magnets 13a.

When the magnet housing 8 reaches an upper end of a conveyor frame 1 and the conveyor belt 4 starts moving downwardly as indicated at B in FIG. 12, the magnet housing 8 is inverted to allow the permanent magnet 13 to turn clockwise by gravity. Then, the magnet forces imposed on the attracting surface of the magnet housing 8 are reduced to release the powdery chips P, which are allowed to fall off by gravity, as shown at C in FIG. 12.

The magnet housing 8 having discharged the powdery chips P reaches a lower run of the conveyor belt 4 in a coolant tank T, as the latter travels in circulatory motion, whereupon the magnet housing 8 is held horizontally and the permanent magnet body 13 depends by gravity in the attractive position Thereafter, powdery chips P in the coolant tank are magnetically attracted to the lower surface of the magnet housing 8 under magnetic forces from the permanent magnet body 13.

The magnet housing 8 with the powdery chips P attracted thereto is moved, while it is being turned upside down, onto an upper run of the conveyor belt 4 as the latter moves. At this time, the permanent magnet body 13 is kept in the attractive position due to engagement between the weight bar 98 and the stop member 99, and hence the powdery chips P can reliably be attracted and transported without falling off the magnet housing 8.

In the fourth embodiment, a rotatable magnet roller 42 may be disposed, as indicated by the two-dot-and-dash lines in FIG. 12, in confronting relation to the magnet housing 8 in the chip discharging position shown at C for forcibly attracting and collecting chips attached to the magnet housing 8, hinged plates 6, and scraper plates after the chips P have been discharged by gravity. Furthermore, a brush 43 may be placed, as indicated by the two-dot-and-dash lines in FIG. 12, in contact with the outer surface of the magnet housing 8 immediately below the chip discharging position C for removing any residual chips off the magnet housing 8 after the chips P have been dumped off.

A chip transporting conveyor according to a fifth embodiment will be described with reference to FIGS. 13 through 15.

A permanent magnet body 86 housed in a magnet housing 8 is in the form of a rod of circular cross section and comprises an array of cylindrical magnets 21a with lead plates 88 interleaved and a cylindrical pipe 87 of stainless steel accommodating the magnets 21a and the lead plates 88 therein. To opposite ends of the permanent magnet body 86, there are attached one ends of support arms 89 of an oval shape having shafts 90 on opposite ends thereof. The shafts 90 of the support arms 89 are journalled respectively in bearings 91 inserted centrally in and secured to the inner surfaces of opposite end walls of the magnet housing 8. As a conveyor belt 4 travels in circulatory motion, the permanent magnet body 86 is angularly movable by gravity between an attractive position shown by the solid line in FIG. 13 and an unattractive position shown by the two-dot-and-dash line, the permanent magnet body 86 being positionally limited in these positions by respectively two stoppers 92, 93 projecting into the magnet housing 8. To prevent the permanent magnet body 86 from swinging easily from the attractive position to the unattractive position, the permanent magnet body 86 engages the stopper 93 while the permanent magnet body 86 is slightly tilted backward from the center of the magnet housing 8.

In operation, as shown in FIG. 15, the magnet housing 8 is first in the position as shown at A and magnetically attracts powdery chips P on its upper surface. As the conveyor 4 moves in a circulatory path, the magnet housing 8 is tilted from the position A, allowing the permanent magnet body 86 to swing to the unattractive position by gravity as indicated at B, and then the powdery chips P fall off the magnet housing 8 as indicated at C. When the magnet housing 8 is inverted 180° from the position A, the permanent magnet body 86 depends by gravity as shown at D to attract powdery chips P in the coolant tank or the bottom of the conveyor frame to the lower surface of the magnet housing 8. Then, the magnet housing 8 with the powdery chips P attracted is moved back to the position A with the permanent magnet body 86 held in the attractive position through a position indicated at E. The chip transporting conveyor of the fifth embodiment is as simple and advantageous as those of the previous embodiments.

The embodiment as shown in FIGS. 1, 3 through 5 may be applied to the chip transporting conveyor with scrapers according to the second embodiment.

Although certain preferred embodiment have been shown and described, it should be understood that many changes and modifications may be made therein without departing from the scope of the appended claims.

What is claimed is:

1. A chip transporting conveyor comprising:
a conveyor frame;
an endless carrier movably mounted on said conveyor frame and operable in circulatory motion for transporting chips and discharging at a terminal end of a conveyor zone;
said endless carrier having at least one magnet housing extending transversely of the endless carrier; and
a permanent magnet body accommodated in said magnet housing and movable by gravity as said endless carrier travels in circulatory motion therein between an attractive position in which said permanent magnet body is located adjacent to an inner wall surface of said magnet housing for attracting the chips to an attracting surface of said magnet housing while the chips are being transported and an unattractive position in which said permanent magnet body is located remotely from said inner wall surface for discharging the chips off said magnet housing when the latter is inverted around said terminal end.

2. A chip transporting conveyor according to claim 1, wherein said permanent magnet body is moved by gravity when said magnet body is inverted as said endless carrier travels in circulatory motion, said magnet housing having guide means therein for guiding the movement of said permanent magnet body.

3. A chip transporting conveyor according to claim 2, wherein said guide means comprises a pair of confronting front and rear guide members defining therebetween two magnet accommodating spaces spaced from each other and a magnet falling passage interconnecting said magnet accommodating spaces.

4. A chip transporting conveyor according to claim 2, wherein said guide means comprises a plurality of guide plates fixed to opposite ends of said magnet housing and having straight guide recesses extending transversely of said magnet housing.

5. A chip transporting conveyor according to claim 2, wherein said guide means comprises a pair of guide plates attached to opposite ends of said magnet housing, each of said guide plates having a guide hole receiving therein a support shaft on one end of said permanent magnet body.

6. A chip transporting conveyor according to claim 5, wherein said guide plate has a holder projection extending into said guide hole for holding said permanent magnet body in said attractive position when said magnet housing lies horizontally.

7. A chip transporting conveyor according to claim 1, further including fluid ejecting means positioned in confronting relation to said endless carrier for ejecting a fluid against said attracting surface of said magnet housing in response to arrival of the latter at a position for discharging the chips.

8. A chip transporting conveyor according to claim 7, wherein said fluid ejecting means comprises a nozzle, a valve connected bewteen said nozzle and a fluid source, and an actuator operable in response to said magnet housing reaching the discharging position for opening said valve.

9. A chip transporting conveyor according to claim 8, wherein said conveyor frame has a pair of side plates, said nozzle being angularly movably supported on and between said side plates of said conveyor frame for adjusting the angle at which the fluid is ejected from said nozzle.

10. A chip transporting conveyor according to claim 8, wherein said conveyor frame has a chain wheel shaft supporting said endless carrier and a bearing unit on which said chain wheel shaft is rotatably mounted, said bearing unit being movable for adjusting the tension of said endless carrier, said valve being attached to said bearing unit and movable with said chain wheel shaft when said bearing unit is moved for adjusting the tension of said endless carrier.

11. A chip transporting conveyor according to claim 8, wherein said actuator comprises a cam roller rotatably mounted on one end of said magnet housing, and a plunger retractably mounted on said valve for contact with said cam roller.

12. A chip transporting conveyor according to claim 1, wherein said permanent magnet body is disposed off center in said magnet housing for gravity-induced movement between said attractive and unattractive positions when said endless carrier travels in circulatory motion.

13. A chip transporting conveyor according to claim 12, wherein said permanent magnet body comprises an array of rod-shaped magnets and an inner box of stainless steel having an open side and accommodating said rod-shaped magnets therein.

14. A chip transporting conveyor according to claim 12, wherein said magnet housing has a pair of bushings secured to opposite inner surfaces thereof, said permanent magnet body having eccentric shafts projecting opposite ends thereof and supported by said bushings, respectively.

15. A chip transporting conveyor according to claim 14, wherein said permanent magnet body has a weight attached to an outer surface thereof for positionally adjusting the center of gravity thereof.

16. A chip transporting conveyor according to claim 15, wherein said magnet housing has a stop member disposed therein for engagement with said weight to limit swinging movement thereof in one direction.

17. A chip transporting conveyor according to claim 12, wherein said magnet housing has bearings secured to opposite inner end surfaces thereof, said permanent magnet body having on opposite ends thereof a pair of support arms having shafts projecting outwardly from distal ends of said support arms, respectively, and journalled in said bearings, respectively.

18. A chip transporting conveyor according to claim 1, wherein said permanent magnet body comprises an array of rod-shaped magnets connected axially and a cylindrical pipe accommodating said rod-shaped magnets therein.

* * * * *